United States Patent
Jibu et al.

(10) Patent No.: US 9,268,113 B2
(45) Date of Patent: Feb. 23, 2016

(54) SCANNING LENS AND METHOD FOR MANUFACTURING SCANNING LENS

(71) Applicants: Yasuomi Jibu, Ichinomiya (JP); Kazunobu Wada, Inazawa (JP)

(72) Inventors: Yasuomi Jibu, Ichinomiya (JP); Kazunobu Wada, Inazawa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 25 days.

(21) Appl. No.: 14/099,402

(22) Filed: Dec. 6, 2013

(65) Prior Publication Data

US 2014/0160578 A1   Jun. 12, 2014

(30) Foreign Application Priority Data

Dec. 7, 2012   (JP) ................................ 2012-268017

(51) Int. Cl.
| | |
|---|---|
| *G02B 13/00* | (2006.01) |
| *B29C 45/40* | (2006.01) |
| *G02B 26/12* | (2006.01) |
| *B29D 11/00* | (2006.01) |
| *B29L 11/00* | (2006.01) |

(52) U.S. Cl.
CPC .......... *G02B 13/0005* (2013.01); *B29C 45/401* (2013.01); *B29D 11/0048* (2013.01); *G02B 26/125* (2013.01); *B29L 2011/0016* (2013.01)

(58) Field of Classification Search
CPC ............. G02B 13/0005; B29C 45/401; B29C 2045/4015; B29C 2045/4021
USPC ................................................ 359/206.1, 662
See application file for complete search history.

(56) References Cited

U.S. PATENT DOCUMENTS

| | | | |
|---|---|---|---|
| 6,525,386 B1* | 2/2003 | Mills et al. | 257/433 |
| 2010/0177400 A1* | 7/2010 | Yamamura | 359/619 |
| 2011/0242673 A1* | 10/2011 | Jibu et al. | 359/662 |

FOREIGN PATENT DOCUMENTS

| | | |
|---|---|---|
| JP | 58-175916 U | 11/1983 |
| JP | 1-128817 A | 5/1989 |
| JP | 2003-305754 A | 10/2003 |
| JP | 2005-351914 A | 12/2005 |
| JP | 2008-221623 A | 9/2008 |
| JP | 2008-241817 A | 10/2008 |
| JP | 2009-298016 A | 12/2009 |
| JP | 2010-247539 A | 11/2010 |

OTHER PUBLICATIONS

Notification of Reason(s) for Refusal issued in counterpart Japanese Patent application No. 2012-268017, Dec. 15, 2015.

* cited by examiner

*Primary Examiner* — Jordan Schwartz
(74) *Attorney, Agent, or Firm* — Merchant & Gould PC

(57) ABSTRACT

A scanning lens molded of resin includes: a lens portion having an elongate shape extending in a main scanning direction and having an optical surface; a slant portion having at least one slant surface slanting relative to the main scanning direction; and an ejector pin mark formed on the slant surface when thrusting out the scanning lens by ejector pins. The ejector pin mark is formed along a slanting direction of the slant surface.

10 Claims, 6 Drawing Sheets

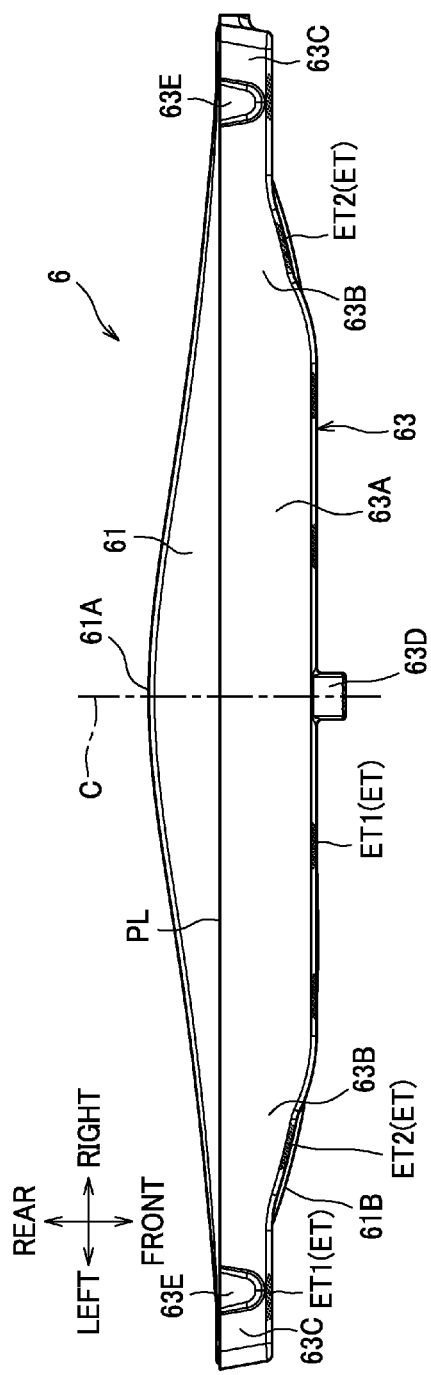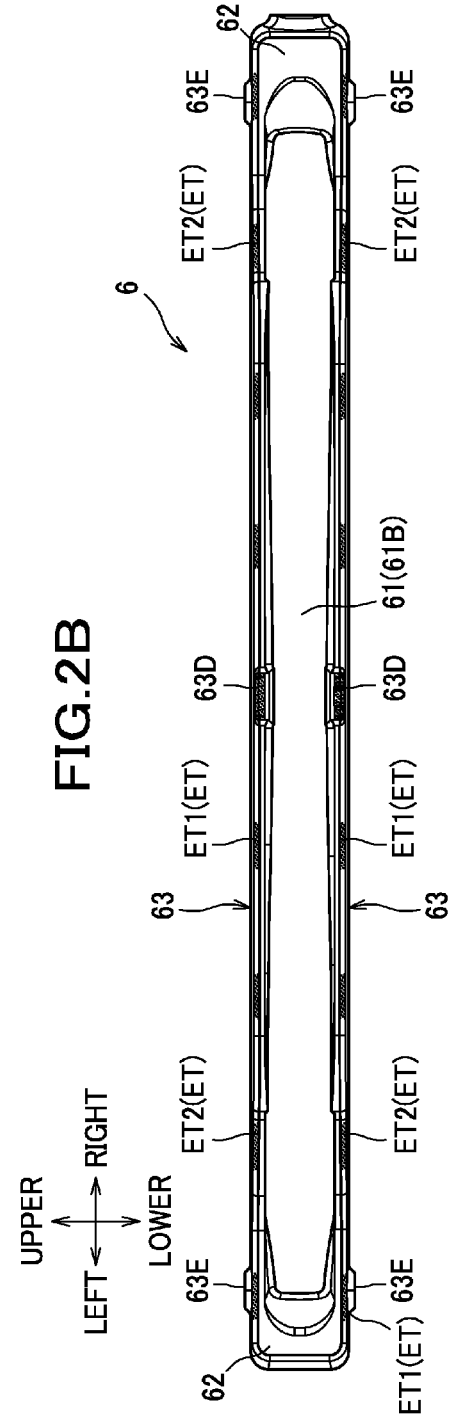

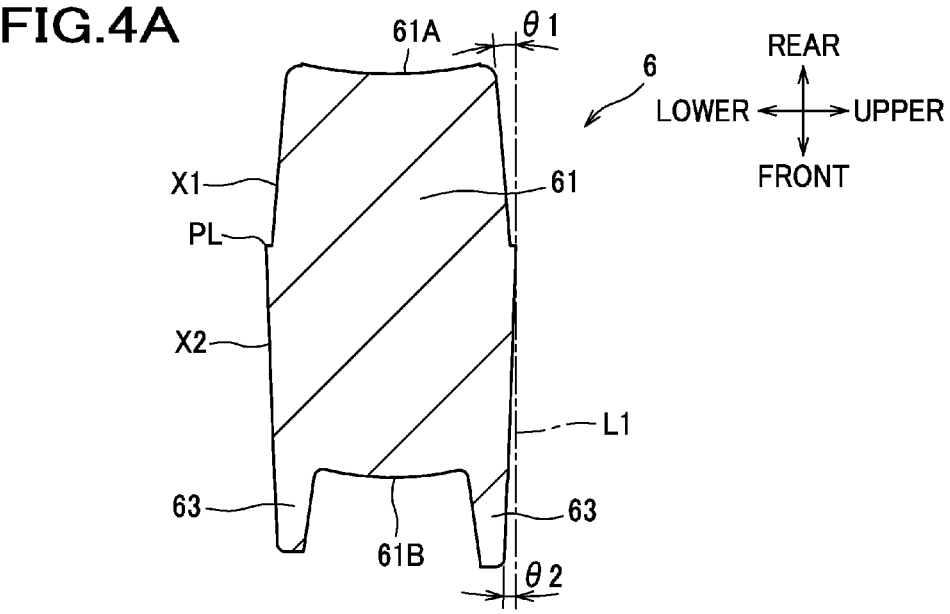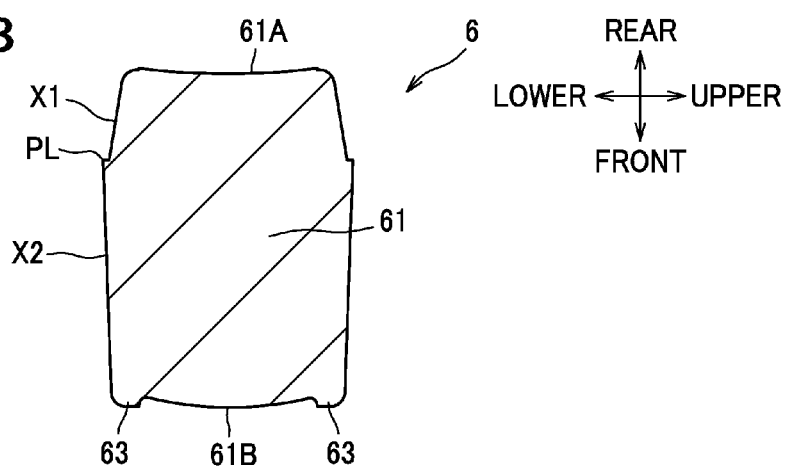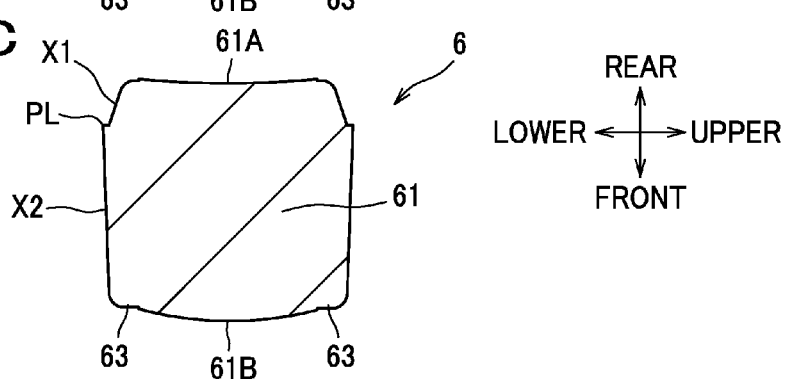

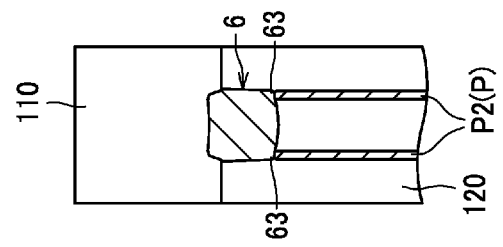
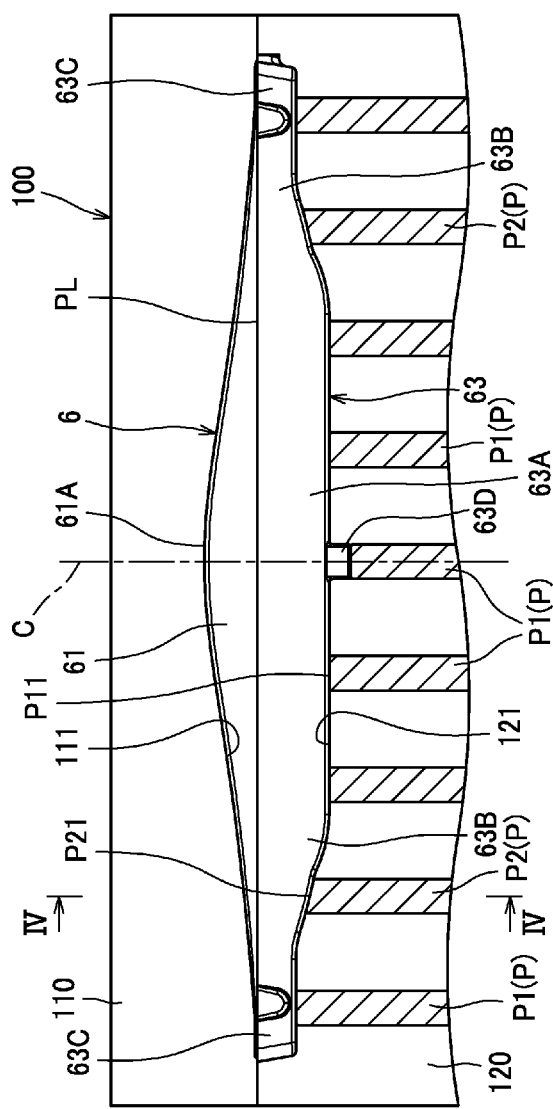
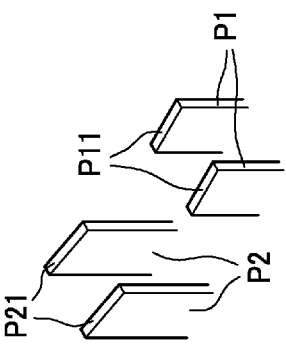

SCANNING LENS AND METHOD FOR MANUFACTURING SCANNING LENS

CROSS-REFERENCE TO RELATED APPLICATION(S)

This application claims priority from Japanese Patent Application No. 2012-268017 filed on Dec. 7, 2012, the disclosure of which is incorporated herein by reference in its entirety.

TECHNICAL FIELD

The present invention relates to a scanning lens molded of resin and a method for manufacturing the scanning lens.

BACKGROUND ART

In the conventionally-known method for manufacturing a scanning lens made of plastic resin, resin is injected into a mold having a cavity corresponding to the contour of the scanning lens, and thereafter the molded product in the mold is thrust out by ejector pins. Accordingly, the scanning lens is removed from the mold. To be more specific, the scanning lens has flat surfaces parallel to the main scanning direction, and the ejector pins push these surfaces in the optical axis direction by their distal end faces (surfaces parallel to the main scanning direction), thereby removing the scanning lens from the mold.

A scanning lens may have slant surfaces slanting relative to the main scanning direction. If this scanning lens is thrust out by the conventionally-known ejector pins each having a flat distal end face parallel to the main scanning direction, the scanning lens may not be removed easily and smoothly by the ejector pins, because these ejector pins are unable to arrange at positions corresponding to the slant surfaces.

It would be desirable to provide a scanning lens such that removal of the scanning lens from a mold can be performed with increased ease.

SUMMARY OF THE INVENTION

According to one aspect of the present invention, there is provided a scanning lens molded of resin comprising: a lens portion having an elongate shape extending in a main scanning direction and having an optical surface; a slant portion having at least one slant surface slanting relative to the main scanning direction; and an ejector pin mark formed on the slant surface when thrusting out the scanning lens by ejector pins. The ejector pin mark is formed along a slanting direction of the slant surface.

According to another aspect of the present invention, there is provided a method for manufacturing a scanning lens comprising a lens portion having an elongate shape extending in a main scanning direction and having an optical surface, and a slant portion having at least one slant surface slanting relative to the main scanning direction. The method comprises: a first step of injecting resin into a mold having a mold area corresponding to a contour of the scanning lens; and a second step of removing the scanning lens from the mold by moving ejector pins in an optical axis direction of the scanning lens. The ejector pins include at least one ejector pin having an end face shaped along a slanting direction of the slant surface, whereby the slant surface is pressed by the end face of the at least one ejector pin.

BRIEF DESCRIPTION OF THE DRAWINGS

To better understand the claimed invention, and to show how the same may be carried into effect, reference will now be made, by way of example only, to the accompanying drawings, in which:

FIG. 2A is a view of the scanning lens as viewed from above;

FIG. 2B is a view of the scanning lens as viewed from front;

FIG. 4A is a sectional view taken long the line I-I of FIG. 3;

FIG. 4B is a sectional view taken along the line II-II of FIG. 3;

FIG. 4C is a sectional view taken along the line III-III of FIG. 3;

FIG. 5A is a sectional view showing a mold for manufacturing the scanning lens;

FIG. 5B is a sectional view taken along the line IV-IV of FIG. 5A;

FIG. 5C is a perspective view showing distal end faces of second ejector pins.

DESCRIPTION OF EMBODIMENT

A detailed description will be given of an illustrative embodiment of the present invention with reference to the accompanying drawings. In the following description, an overall configuration of an optical scanner equipped with a scanning lens according to one exemplary embodiment of the present invention will be briefly described, and then, the configuration of the scanning lens will be described in detail.

Figure 1:
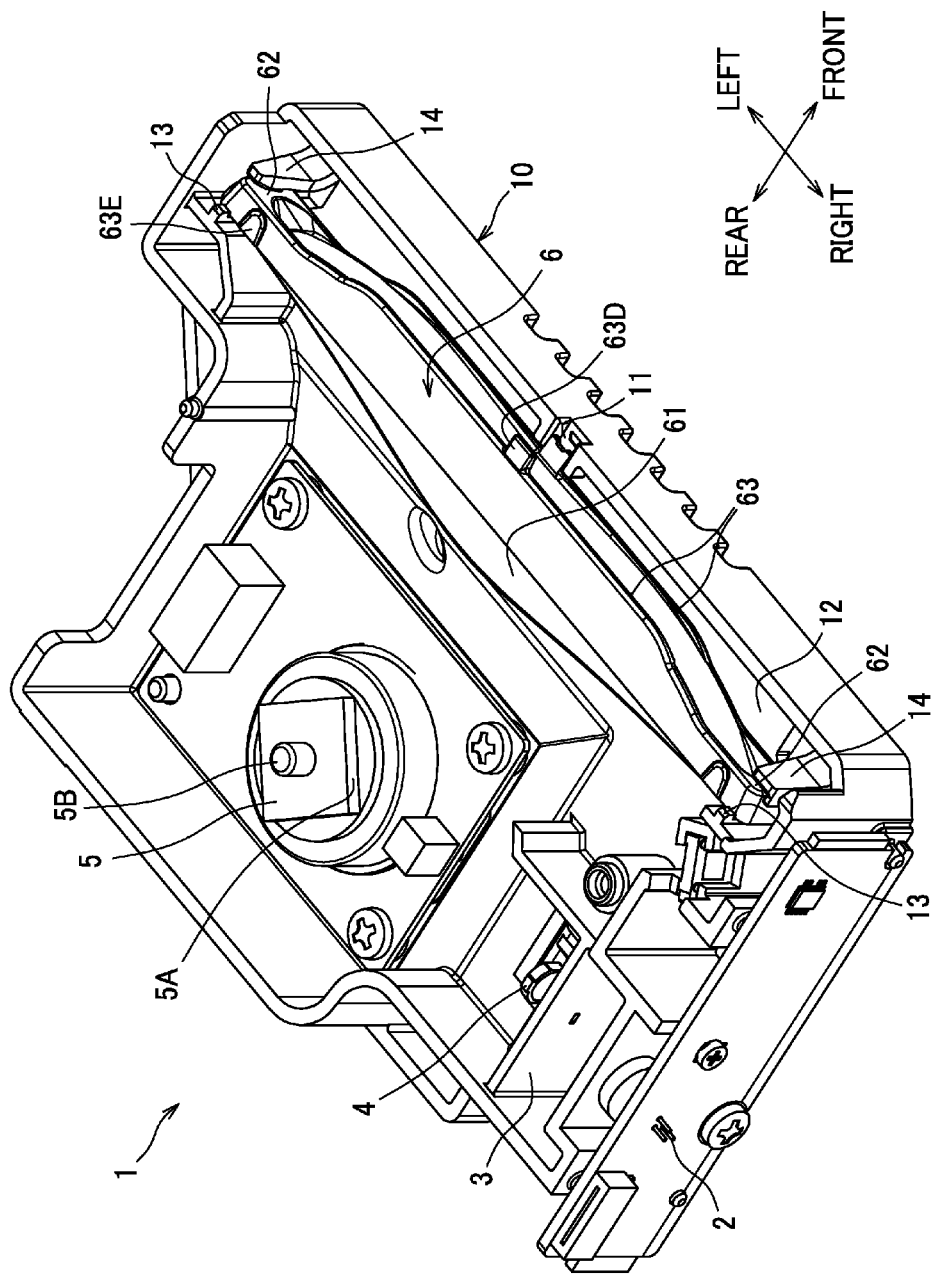
FIG. 1 is a perspective view showing an optical scanner provided with a scanning lens according to one exemplary embodiment of the present invention.

As seen in FIG. 1, an optical scanner 1 mainly includes a semiconductor laser 2 as an example of a light source, an aperture stop 3, a coupling lens 4, a polygon mirror 5, a scanning lens 6, and a frame 10 to which the scanning lens 6 and other optical elements are fixed. The optical scanner 1 is configured to convert a laser beam emitted from the semiconductor laser 2 into a spot-like image and focus the spot-like image on a target surface to be scanned of a photoconductor drum (not shown) while scanning the target surface with the laser beam.

The aperture stop 3 is a plate-like member having an opening substantially in the shape of a rectangle. The aperture stop defines width of the laser beam emitted from the semiconductor laser 2 both in the main scanning direction and the sub-scanning direction.

The coupling lens 4 is configured to convert the laser beam having passed through the aperture stop 3 into a light flux substantially parallel to the main scanning direction, and to focus it on the polygon mirror 5 in the sub-scanning direction.

The polygon mirror 5 includes four mirror surfaces 5A disposed equidistantly from an axis of rotation 5B. The polygon mirror 5 spins at a constant rotational speed around the axis of rotation 5B and reflects and thus deflects the laser beam having passed through the coupling lens 4 in the main scanning direction.

The scanning lens 6 allows the laser beam deflected by the polygon mirror 5 to pass therethrough. The scanning lens 6 is configured to converge or refract the laser beam in the main scanning direction and in the sub-scanning direction (i.e., direction orthogonal to both the main scanning direction and the optical axis direction), to thereby convert the laser beam into a spot-like image and focus the spot-like image on the target surface as well as to correct an optical face tangle error of the mirror surfaces 5A of the polygon mirror 5. The scanning lens 6 has f-theta characteristics such that the laser beam deflected at a constant angular velocity by the polygon mirror 5 is converted into a laser beam that scans the target surface at a constant linear velocity.

In the following description, the optical axis direction of the scanning lens 6 is also referred to as a front-rear direction, the main scanning direction is also referred to as a right-left direction, and the sub-scanning direction is also referred to as an upper-lower direction, as a manner of convenience.

<Configuration of Scanning Lens 6>

The configuration of the scanning lens 6 and the method for manufacturing the scanning lens 6 will be described in detail.

As seen in FIGS. 1 and 2, the scanning lens 6 is molded of resin, and mainly includes a lens portion 61 having an elongate shape extending in the right-left direction and having both longitudinal ends located opposite to and away from each other in the right-left direction, a pair of flange portions 62 provided at the longitudinal ends of the lens portion 61, and a pair of rib portions 63 (slant portion having at least one slant surface) extending in the right-left direction and provided at upper and lower sides of the lens portion 61 and the flange portions 62.

Figure 3:
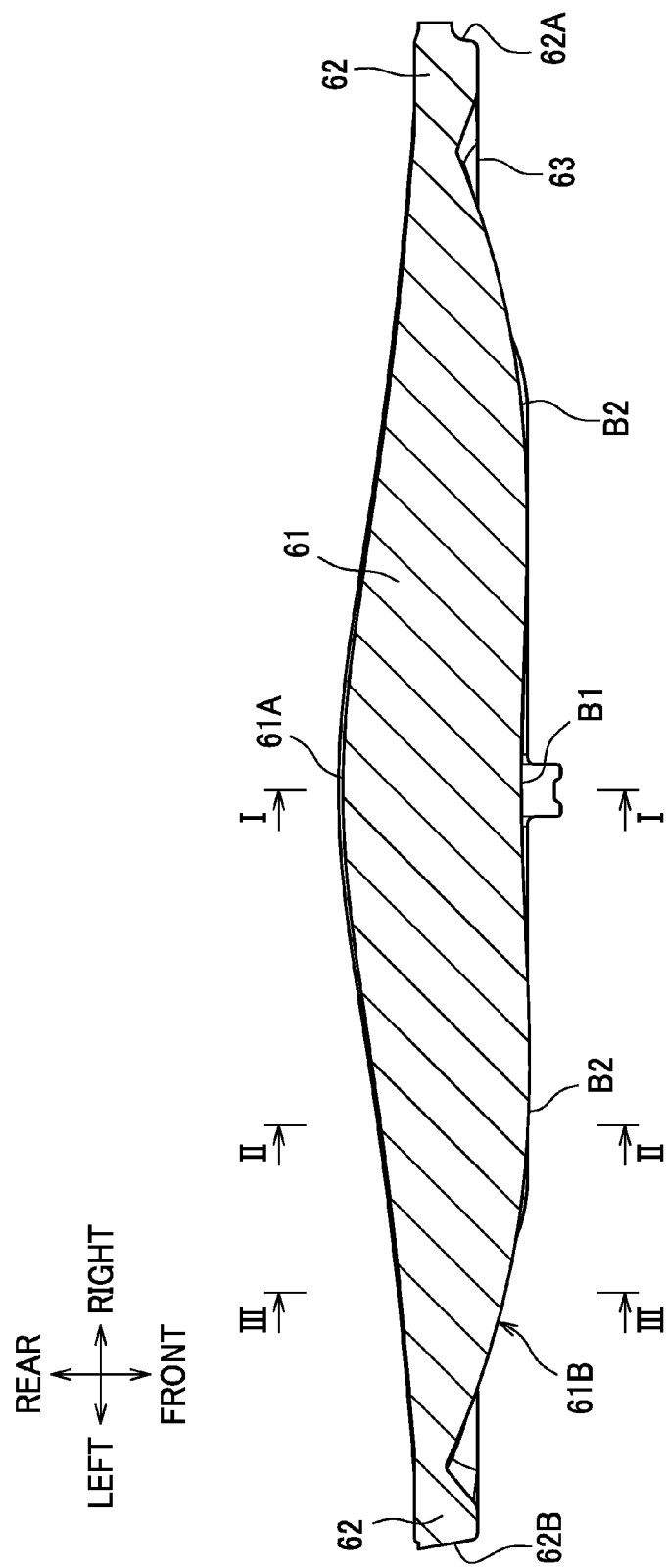
FIG. 3 is a sectional view of the scanning lens taken in a plane orthogonal to the upper-lower direction.

As seen in FIG. 3, the lens portion 61 is increased in thickness in the optical axis direction at a center portion thereof located at a center in the right-left direction, and both longitudinal end portions of the lens portion 61 are formed to taper with distance outward from the center portion. The lens portion 61 includes a rear surface as a first optical surface 61A, on which the laser beam reflected by the polygon mirror 5 is incident, and a front surface as a second optical surface 61B from which the laser beam exits toward the photoconductor drum.

The first optical surface 61A has a substantially arcuate sectional shape as viewed from the upper-lower direction such that a center portion thereof in the right-left direction protrudes outward in the front-rear direction. The second optical surface 61B is formed, as viewed from the upper-lower direction, such that a center portion thereof in the right-left direction is recessed inward in the front-rear direction to form a recess portion B1 and both side portions located on both sides of the recess portion B1 in the right-left direction protrude outward in the front-rear direction to form a pair of protruding portions B2.

Further, as seen in FIGS. 4A to 4C, the first optical surface 61A is formed such that its cross-section taken along a plane perpendicular to the right-left direction is shaped to provide a substantially arcuate shape of which a center portion in the upper-lower direction is recessed inward in the front-rear direction. The second optical surface 61B is formed such that its cross-section taken along a plane perpendicular to the right-left direction is shaped to provide a substantially arcuate shape of which a center portion in the upper-lower direction protrudes outward in the front-rear direction.

The scanning lens 6 includes sides in the upper-lower direction, such as a first side X1 located at the rear of a parting line PL, that is a side closer to the first optical surface 61A, and a second side X2 located at the front of the parting line P, that is a side of the rib portion 63 closer to the second optical surface 61B. The first side X1 inclines at an angle θ1 with respect to a straight line L1 parallel to the optical axis such that the thickness of the scanning lens 6 in the upper-lower direction gradually decreases at the first side X1 with distance from the parting line PL toward the first optical surface 61A. On the contrary, the second side X2 inclines at an angle θ2 with respect to the straight line L1 parallel to the optical axis such that the thickness of the scanning lens 6 in the upper-lower direction gradually decreases at the second side X2 with distance from the parting line PL toward the second optical surface 61B. Further, the first side X1 and the second side X2 are formed to satisfy θ1>θ2. This can causes the first optical surface side of the scanning lens 6 to be removed from the mold when separating the mold.

As seen in FIG. 3, the flange portions 62 are integrally formed with the longitudinal ends of the lens portion 61. The flange portions 62 are formed such that a width thereof in the front-rear direction is gradually increased with distance outward in the right-left direction from the both longitudinal ends of the lens portion 61. Namely, the lens portion 61 and the flange portions 62 are formed such that each of the portions at and around the interfaces between the lens portion 61 and the both flange portion 62 is constricted to provide a constricted portion having a width narrower than the remaining portion.

Further, a pair of rib portions 63 are formed at upper and lower sides of the lens portion 61 and the flange portions 62; each rib portion 63 extends in the right-left direction along the lens portion 61 and the flange portions 62 from an outer end face 62A of one flange portion 62 to an outer end face 62B of the other flange portion 62. With this configuration, deformations of the lens portion 61 and each flange portion 62, especially a deformation at the constricted portion, can be suppressed by the rib portions 63.

As seen in FIG. 2A and 2B, the pair of rib portions 63 are formed to have the same size and shape; the rear surface of each rib portion 63 extends in the right-left direction and is formed as a flat surface perpendicular to the front-rear direction, and the front surface of each rib portion 63 is formed to protrude outward in the front-rear direction at its center portion located at a center in the right-left direction. A parting line PL corresponding to the place where two parts of the mold meet and extending in the right-left direction is formed at the edge of the rear surface of each rib portion 63.

Each rib portion 63 includes a widened portion 63A located at a center in the right-left direction and extends in the right-left direction, a pair of slanted portions 63B extending outward in the right-left direction from both ends of the widened portion 63A such that the width thereof in the front-rear direction is gradually decreased with distance from the both ends of the widened portion 63A, and a pair of narrowing portions 63C extending outward in the right-left direction from the outer ends of the slanted portions 63B located outward in the right-left direction.

The front surface of the widened portion 63A is formed to follow the right-left direction, and at its center of the front surface there is provided a first positioning portion 63D which protrudes frontward in the front-rear direction. As seen in FIG. 1, the first positioning portion 63D is fitted into a positioning recess portion 11 formed in the frame 10, so that the scanning lens 6 is positioned in the right-left direction with respect to the frame 10.

The front surface of each slanted portion 63B is formed to slant relative to the right-left direction; specifically, the front surface is slanted in a direction frontward from the front surface of the narrowing portion 63C (i.e., in a direction away from the parting line PL) toward inward of the rib portion 63 in the right-left direction. In other words, the front surface of the slanted portion 63B is formed such that a portion of the front surface extending frontward from the front surface of the narrowing portion 63C toward the widened portion 63A is located more inward in the right-left direction with distance from the front surface of the narrowing portion 63C.

The front surface of each narrowing portion 63C is formed to follow the right-left direction. A second positioning portion 63E is formed at an outer side of the narrowing portion 63C which is located outside in the upper-lower direction, and protrudes outward in the upper-lower direction. The second positioning portion 63E tapers such that the width thereof in the right-left direction is gradually reduced with distance in the frontward direction, and a front end of the second positioning portion 63E is rounded to have a substantially circular arc shape. The second positioning portions 63E are brought into contact with the bottom portion 12 of an open-topped box-like frame 10 as shown in FIG. 1. Accordingly, the scanning lens 6 is positioned in the upper-lower direction with respect to the frame 10.

Positioning of the scanning lens 6 in the front-rear direction is performed by positioning ribs 13 provided in the frame 10 and resin springs 14 integrally formed with the frame 10; namely, the resin springs 14 urge the flange portions 62 toward the positioning ribs 13 so that rear sides of the flange portions 62 are brought into contact with the positioning ribs 13.

As seen in FIGS. 2A and 2B, a plurality of ejector pin marks ET are formed on the front surface of each rib portion 63 and are almost equidistantly spaced apart from each other in the right-left direction. The ejector pin marks ET are formed when the scanning lens 6 is thrust out by a plurality of ejector pins P to be described later. Each ejector pin mark ET has a shape formed by transferring the distal end of the ejector pin P (e.g., the ejector pin mark ET with a very small height or an uneven surface having a surface roughness different from that of the other adjacent portions of the rib portion 63). In FIGS. 2A and 2B, the ejector pin marks ET are shown by dotted pattern as a matter of convenience.

The plurality of ejector pin marks ET include first ejector pin marks ET1 which are formed on the front surface of the widened portion 63A and the front surfaces of the narrowing portions 63C, and second ejector pin marks ET2 which are formed on the front surfaces of the slanted portions 63B. The surface of each first ejector pin mark ET1 intersecting the front-rear direction is formed as a flat surface extending in the right-left direction, whereas the surface of each second ejector pin mark ET2 intersecting the front-rear direction is formed as a flat surface extending in a direction along which the front surface of the slanted portion 63B extends (i.e., slanting direction of the slanted portion 63B).

In other words, one rib portion 63 includes two slanted portions 63B each provided with one second ejector pin mark ET2. Further, one slanted portion 63B and the second ejector pin mark ET2 formed on the one slanted portion 63B are spaced apart from the other slanted portion 63B and the second ejector pin mark ET2 formed on the other slanted portion 63B in the right-left direction, and these slanted portions 63B and second ejector pin marks ET2 slant obliquely forward in the front-rear direction and inward in the right-left direction.

Further, two slanted portions 63B and two ejector pin marks ET2 are provided symmetrically with respect to the center C of the first optical surface 61A. Further, as seen in FIG. 2B, two second ejector pin marks ET2 formed on the upper rib portion 63 and two second ejector pin marks ET2 formed on the lower rib portion 63 are located on the same positions in the right-left direction.

<Manufacturing Method for the Scanning Lens 6>

Next, the manufacturing method for the scanning lens 6 will be described in detail.

According to the manufacturing method in this exemplary embodiment, the scanning lens 6 is manufactured using a mold 100 as shown in FIGS. 5A and 5B. First, description will be given of the mold 100.

The mold 100 includes an upper mold 110 and a lower mold 120 each of which has a mold area 111, 121 corresponding to the contour of the scanning lens 6. For ease of reference, hatching is used in sectional views of FIGS. 5A, 5B, and 6, only where it seems necessary.

A plurality of ejector pins P are provided at the mold area 121 of the lower mold 120 at positions corresponding to the front surfaces of the pair of rib portions 63. To be more specific, a plurality of first ejector pins P1 are provided for each rib portion 63 at positions corresponding to the front surfaces of the widened portion 63A and the narrowing portion 63C; each first ejector pin P1 has a distal end face P11 formed as a flat surface extending along the front surface of the widened portion 63A or the front surface of the narrowing portion 63C.

For each of the rib portions 63, the plurality of first ejector pins P1 include one first ejector pin P1 located at a position corresponding to the center C of the first optical surface 61A, and the other first ejector pins P1. The one first ejector pin P1 is arranged at a position corresponding to the end face of the first positioning portion 63D, and the other first ejector pins P1 are arranged symmetrically with respect to the center C of the first optical surface 61. In other words, the other first ejector pins P1 are arranged in pairs at positions equidistant from the center C of the first optical surface 61.

Second ejector pins P2 are provided at positions corresponding to the slanted front surfaces of the slanted portions 63B of the pair of rib portions 63; each second ejector pin P2 has a distal end face P21 (see FIG. 5C) formed as a flat surface extending along the slanting direction of the slanted front surface of the slanted portion 63B. The second ejector pins P2 are provided at positions corresponding to the four slanted portions 63B which are arranged spaced apart in the main scanning direction and in the sub-scanning direction. One second ejector pin P2 is provided at each slanted portion 63B, and the distal end face P21 of each second ejector pin P2 is slanted in a direction away from the parting line PL of the scanning lens 6 toward inward of the scanning lens 6 in the main scanning direction.

Further, the plurality of second ejector pins P2 are provided symmetrically in the main scanning direction with respect to the center P of the first optical surface 61A. In other words, the second ejector pins P2 are arranged in pairs at positions equidistant from the center C of the first optical surface 61. Further, two second ejector pins P2 arranged at positions corresponding to the two slanted portions 63B of one rib portion 63 and two second ejector pins P2 arranged at positions corresponding to the two slanted portions 63B of the other rib portion 63 are located on the same positions in the main scanning direction, namely they are overlapped one another as viewed from the upper-lower direction.

Next, the manufacturing method for the scanning lens 6 will be described.

Figure 6:
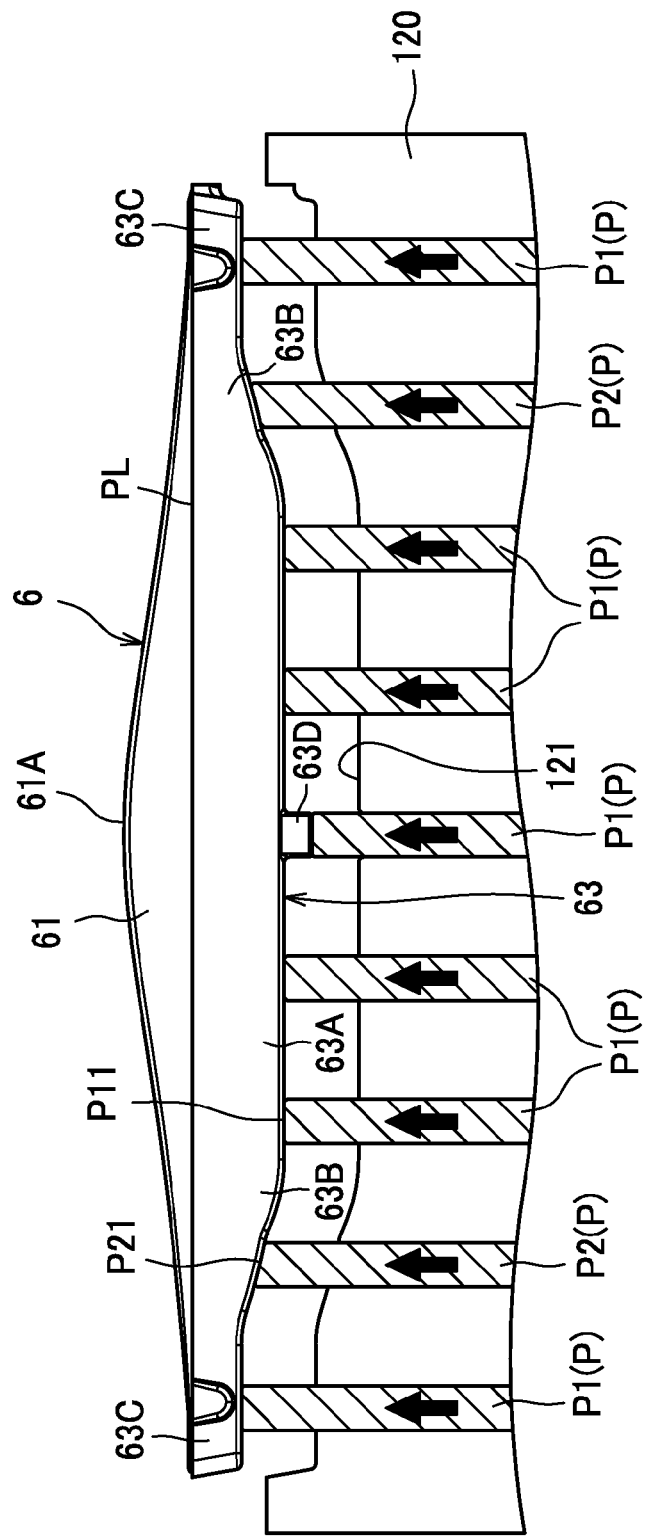
FIG. 6 is an explanatory sectional view illustrating the scanning lens removed from the lower mold.

While the upper mold 110 and the lower mold 120 are coupled together, molten resin is injected into the mold 100 to form a scanning lens 6 (first step). Thereafter, the upper mold 110 is released from the lower mold 120, so that the first optical surface 61A side of the scanning lens 6 is separated from the upper mold 110 and exposed to view while the scanning lens 6 remains in the lower mold 120. As seen in FIG. 6, when the plurality of ejector pins P are moved in the optical axis direction of the scanning lens 6 so that each of the rib portions 63 is pushed by the ejector pins P, the scanning lens 6 is thrust out from the mold area 121 of the lower mold 120 and thus removed from the lower mold 120 (second step).

In the second step, since each of the slanted portions 63B is pushed by the slanted distal end face P21 of each second ejector pin P2, the slanted portions 63B are pushed appropriately by the second ejector pins P2, so that the scanning lens 6 can be removed easily and smoothly from the lower mold 120.

Since the second ejector pins P2 spaced apart in the main scanning direction and arranged at both sides of the scanning lens 6 have the distal end faces P21 formed as slant surfaces facing inward of the scanning lens 6 in the main scanning direction. This can cause the distal end faces P21 of the ejector pins P2 to be appropriately kept in contact with the scanning lens 6 and to push out the scanning lens 6 easily and smoothly from the lower mold 120. Further, since the slanted portions 63B of the scanning lens 6 are thrust out by the second ejector pins P2 which are arranged symmetrically with respect to the center C of the first optical surface 61A, force can be applied in good balance to the scanning lens 6, so that the scanning lens 6 can be removed easily and smoothly from the lower mold 120.

Further, since the two second ejector pins P2 arranged at positions corresponding to the two slanted portions 63B of one rib portion 63 and the two second ejector pins P2 arranged at positions corresponding to the two slanted portions 63B of the other rib portion 63 are located on the same positions in the main scanning direction, the scanning lens 6 can be pushed in good balance, so that the scanning lens 6 can be removed easily and smoothly from the lower mold 120. Further, since the rib portions 63 for restricting deformation of the scanning lens 6 especially at the lens portion 61 are pushed by the plurality of ejector pins P which are almost equidistantly spaced apart from each other, deformation of the lens portion 6 can be suppressed upon removal of the scanning lens 6 from the lower mold 120.

Although an illustrative embodiment of the present invention have been described in detail, the present invention is not limited to this specific embodiment. It is to be understood that various changes and modifications, such as those described below, may be made without departing from the scope of the appended claims. In the following description, parts similar to those previously described in the above embodiment are denoted by the same reference numerals and detailed description thereof will be omitted.

In the above embodiment, a pair of rib portions 63 each including two slanted portions 63B are exemplified as a slant portion having at least one slant surface. However, the present invention is not limited to this specific configuration. For example, the slant portion may be a pair of flange portions each having a slant surface. In this instance, ejector pins each having a slanted distal end face may be arranged at positions corresponding to these slant surfaces.

In the above embodiment, the scanning lens 6 has the parting line PL provided in the vicinity of the center of the lens portion 61 in the optical axis direction. However, the present invention is not limited to this specific configuration. According to the invention, the parting line may be formed at any position of the scanning lens 6; for example, the scanning lens may have a parting line at one end of the lens portion in the optical axis direction.

What is claimed is:

1. A scanning lens molded of resin comprising:
a lens portion having an elongate shape extending in a main scanning direction and having an optical surface;
a plurality of slant surfaces each slanting relative to the main scanning direction; and
ejector pin marks formed when thrusting out the scanning lens from a mold by ejector pins,
wherein at least one slant surface and an ejector pin mark formed thereon along a slanting direction of the slant surface are provided on each of first and second sides of the lens portion in a sub-scanning direction, and wherein the ejector pin mark arranged at the first side and the ejector pin mark arranged at the second side overlap each other as viewed from the sub-scanning direction.

2. The scanning lens according to claim 1, wherein a parting line extending in the main scanning direction is provided on the scanning lens, wherein at least two slant surfaces are provided spaced apart from each other in the main scanning direction, and wherein each slant surface and each ejector pin mark formed thereon is slanted in a direction away from the parting line toward inward of the scanning lens in the main scanning direction.

3. The scanning lens according to claim 2, wherein the slant surfaces and the ejector pin marks formed thereon are provided symmetrically with respect to a center of the optical surface.

4. A scanning lens molded of resin comprising:
a lens portion having an elongate shape extending in a main scanning direction and having an optical surface;
a slant portion having at least one slant surface slanting relative to the main scanning direction; and
an ejector pin mark formed on the slant surface when thrusting out the scanning lens from a mold by ejector pins,
wherein the ejector pin mark is formed along a slanting direction of the slant surface,
wherein the slant portion includes a pair of rib portions extending in the main scanning direction and provided on first and second sides of the lens portion which are located opposite to and away from each other in a sub-scanning direction, and wherein each of the pair of rib portions has at least one slant surface and an ejector pin mark formed thereon.

5. The scanning lens according to claim 1, wherein a surface of an ejector pin mark intersects an optical axis direction and is formed as a flat surface.

6. A method for manufacturing a scanning lens comprising a lens portion having an elongate shape extending in a main scanning direction and having an optical surface, and a plurality of slant surfaces on each of first and second sides of the lens portion in a sub-scanning direction and each slanting relative to the main scanning direction, the method comprising:
a first step of injecting resin into a mold having a mold area corresponding to a contour of the scanning lens; and
a second step of removing the scanning lens from the mold by moving ejector pins in an optical axis direction of the scanning lens,
wherein the ejector pins include a plurality of ejector pins configured to thrust out said plurality of slant surfaces and each ejector pin having an end face shaped along a slanting direction of the slant surface, whereby the slant surfaces are pressed by the end faces of the ejector pins, and
wherein at least one ejector pin is provided at a position corresponding to each side of the lens portion in a sub-scanning direction, and wherein at least one ejector pin arranged at one side and at least one ejector pin arranged at another side overlap each other as viewed from the sub-scanning direction.

7. The method according to claim 6, wherein an ejector pin is arranged at a position corresponding to each side of the lens portion in the main scanning direction, and the end face of each such the ejector pin is slanted in a direction away from a parting line of the scanning lens toward inward of the scanning lens in the main scanning direction.

8. The method according to claim 7, wherein the ejector pins are provided symmetrically with respect to a center of the optical surface.

9. The method according to claim 6, wherein the end face of at least one ejector pin is formed as a flat surface.

10. The scanning lens according to claim 1, further comprising a pair of rib portions extending in the main scanning direction and provided on first and second sides of the lens portion which are located opposite to and away from each other in a sub-scanning direction, and wherein each of the pair of rib portions has the at least one slant surface and an ejector pin mark formed thereon.

* * * * *